(12) United States Patent
Fujioka et al.

(10) Patent No.: US 12,479,187 B2
(45) Date of Patent: Nov. 25, 2025

(54) FIBER-REINFORCED RESIN SUBSTRATE, PREFORM, INTEGRATED PRODUCT, AND METHOD FOR PRODUCING FIBER-REINFORCED RESIN SUBSTRATE

(71) Applicant: Toray Industries, Inc., Tokyo (JP)

(72) Inventors: Takashi Fujioka, Ehime (JP); Masato Honma, Ehime (JP); Yoshifumi Nakayama, Ehime (JP)

(73) Assignee: Toray Industries, Inc., Tokyo (JP)

( * ) Notice: Subject to any disclaimer, the term of this patent is extended or adjusted under 35 U.S.C. 154(b) by 318 days.

(21) Appl. No.: 18/035,366

(22) PCT Filed: Nov. 15, 2021

(86) PCT No.: PCT/JP2021/041849
§ 371 (c)(1),
(2) Date: May 4, 2023

(87) PCT Pub. No.: WO2022/107709
PCT Pub. Date: May 27, 2022

(65) Prior Publication Data
US 2023/0405967 A1    Dec. 21, 2023

(30) Foreign Application Priority Data
Nov. 20, 2020   (JP) ................. 2020-193154

(51) Int. Cl.
*B32B 5/02*     (2006.01)
*B32B 27/12*    (2006.01)
(Continued)

(52) U.S. Cl.
CPC .............. *B32B 5/02* (2013.01); *B32B 27/12* (2013.01); *B32B 27/20* (2013.01); *B32B 27/34* (2013.01);
(Continued)

(58) Field of Classification Search
CPC ..................................................... B32B 27/12
See application file for complete search history.

(56) References Cited

U.S. PATENT DOCUMENTS

2015/0376353 A1    12/2015   Takebe et al.
2021/0253813 A1    8/2021    Koshi et al.

FOREIGN PATENT DOCUMENTS

JP     2014125532 A    7/2014
JP     2016003257 A    1/2016
(Continued)

OTHER PUBLICATIONS

JP 2014-125532 Machine Translation (Year: 2014).*
(Continued)

*Primary Examiner* — Zachary M Davis
(74) *Attorney, Agent, or Firm* — Buchanan Ingersoll & Rooney PC (57) ABSTRACT

A fiber-reinforced resin substrate is described in which a plurality of resins having differing properties are strongly composited, wherein the fiber-reinforced resin substrate is obtained by impregnating a thermoplastic resin (A) and a thermoplastic resin (B) into continuous reinforcement fibers, wherein a thermoplastic resin (A) layer, which comprises the thermoplastic resin (A) and is exposed at one surface, and a thermoplastic resin (B) layer, which comprises the thermoplastic resin (B) and is exposed at the other surface, form a boundary region, where at least some of the continuous reinforcement fibers exist in a manner spanning across the boundary region and both the thermoplastic resin (A) and the thermoplastic resin (B) are crystalline resins having a melting point of not less than 200° C.

18 Claims, 4 Drawing Sheets

(51) Int. Cl.
  *B32B 27/20*   (2006.01)
  *B32B 27/34*   (2006.01)
(52) U.S. Cl.
  CPC ..... *B32B 2250/02* (2013.01); *B32B 2260/021* (2013.01); *B32B 2260/046* (2013.01); *B32B 2262/02* (2013.01); *B32B 2262/106* (2013.01); *B32B 2307/538* (2013.01); *B32B 2307/54* (2013.01); *B32B 2307/704* (2013.01); *B32B 2307/748* (2013.01)

(56) References Cited

FOREIGN PATENT DOCUMENTS

| | | |
|---|---|---|
| JP | 2020029534 A | 2/2020 |
| JP | 2020192809 A | 12/2020 |
| TW | 202022027 A | 6/2020 |
| WO | 2014103658 A1 | 7/2014 |

OTHER PUBLICATIONS

International Search Report and Written Opinion for International Application No. PCT/JP2021/041849, dated Feb. 8, 2022, 9 pages.
Search Report issued Mar. 24, 2025, by the Taiwan Intellectual Property Office Ministry of Economic Affairs in corresponding Taiwanese Patent Application No. 110142895. (2 pages).

\* cited by examiner

FIBER-REINFORCED RESIN SUBSTRATE, PREFORM, INTEGRATED PRODUCT, AND METHOD FOR PRODUCING FIBER-REINFORCED RESIN SUBSTRATE

CROSS REFERENCE TO RELATED APPLICATIONS

This application is the U.S. National Phase application of PCT/JP2021/041849, filed Nov. 15, 2021 which claims priority to Japanese Patent Application No. 2020-193154, filed Nov. 20, 2020, the disclosures of these applications being incorporated herein by reference in their entireties for all purposes.

FIELD OF THE INVENTION

The present invention relates to a fiber-reinforced resin substrate obtained by impregnating a thermoplastic resin into reinforcing fibers, a preform and an integrated product using the fiber-reinforced resin substrate, and a method for producing a fiber-reinforced resin substrate.

BACKGROUND OF THE INVENTION

Fiber-reinforced composite materials in which a thermosetting resin or a thermoplastic resin is used as a matrix and is combined with reinforcing fibers such as carbon fibers and glass fibers are lightweight, have excellent dynamic characteristics such as strength and rigidity, and therefore are applied to many fields such as aerospace, automobiles, railway vehicles, ships, civil engineering and construction, and sporting goods. These fiber-reinforced composite materials, however, are unsuitable for producing parts or structures having a complicated shape in a single molding process, and in such applications, it is necessary to produce a member including a fiber-reinforced composite material and then to provide a step of integrating the member with another member. At this time, resins having different properties may be combined as necessary. Joining methods using mechanical joining such as bolts, rivets, or screws, and joining methods using an adhesive are used as a method for integrating the fiber-reinforced composite material with the other member. The mechanical joining method has problems in which the production step is prolonged and a production cost is increased because the method requires a step of processing a joint such as creating holes in advance, and the strength of the material is deteriorated because of the holes. The joining method using the adhesive has disadvantages in which the production process is prolonged because the method requires a bonding process including preparation of an adhesive and coating of the adhesive, and a curing process, and the sufficient reliability in bonding strength cannot be obtained.

To the fiber-reinforced composite material using the thermoplastic resin as the matrix can be applied a method for joining members by a thermal welding method, in addition to the method described above, and thus the time required for joining the members may possibly be shortened. As one of thermal welding methods, there is a method of obtaining a molded article made of different types of thermoplastic resins such as two-color molding, but in the case of a method of selecting and combining resins having high compatibility or a combination of resins having low compatibility, integration by shape design such as fitting is the mainstream, and there is a problem in that the degree of freedom in design is low.

Patent Document 1 discloses a technique of joining members using different thermoplastic resins by using a fiber-reinforced resin sheet in which a plurality of different thermoplastic resins are impregnated into a nonwoven fabric made of reinforcing fibers.

PATENT DOCUMENT

Patent Document 1: International Publication No. 2014/103658

SUMMARY OF THE INVENTION

However, in such dissimilar joining, further improvement in joining strength has been required. An object of the present invention is to provide a fiber-reinforced resin substrate useful for strongly joining members using different thermoplastic resins, particularly, different kinds of fiber-reinforced resin members having different thermoplastic resins as matrix resins.

The present invention is a fiber-reinforced resin substrate obtained by impregnating a thermoplastic resin (A) and a thermoplastic resin (B) into continuous reinforcing fibers, wherein a thermoplastic resin (A) layer, which includes the thermoplastic resin (A) and is exposed at one surface, and a thermoplastic resin (B) layer, which includes the thermoplastic resin (B) and is exposed at the other surface, form a boundary region, at least some of the continuous reinforcing fibers exist across the boundary region, and both the thermoplastic resin (A) and the thermoplastic resin (B) are a crystalline resin having a melting point of 200° C. or higher.

Another aspect of the present invention is a method for producing a fiber-reinforced resin substrate obtained by impregnating a thermoplastic resin (A) and a thermoplastic resin (B) into continuous reinforcing fibers, including:

impregnating a thermoplastic resin (A) from one surface of a continuous reinforcing fiber sheet to obtain a semi-preg having a thermoplastic resin (A) layer exposed at one surface and the continuous reinforcing fiber sheet exposed at the other surface; impregnating a thermoplastic resin (B) from the other surface of the semi-preg or impregnating a thermoplastic resin (B) from one surface of the continuous reinforcing fiber sheet to obtain a semi-preg having a thermoplastic resin (B) layer exposed at one surface and the continuous reinforcing fiber sheet exposed at the other surface; and impregnating the thermoplastic resin (A) from the other surface of the semi-preg.

By using the fiber-reinforced resin substrate of the present invention, it is possible to produce an integrated product in which members using two thermoplastic resins are strongly joined.

BRIEF DESCRIPTION OF THE DRAWINGS

FIG. 3(a) is an observation cross section in which a radial direction of reinforcing fibers is observed, FIG. 3(b) is a cross section in which a length direction of reinforcing fibers is observed, and FIGS. 3(a) and 3(b) helps to explain facing surfaces and boundary regions.

DETAILED DESCRIPTION OF EMBODIMENTS OF THE INVENTION

Hereinafter, a fiber-reinforced resin substrate according to the present invention will be described. Hereinafter, the wording "to" in a numerical range represents that the range includes numerical values at both ends thereof.

The fiber-reinforced resin substrate according to the present invention includes at least continuous reinforcing fibers, a thermoplastic resin (A), and a thermoplastic resin (B).

<Reinforcing Fiber>

Examples of the reinforcing fibers used in the present invention include glass fibers, carbon fibers, metal fibers, aromatic polyamide fibers, polyaramid fibers, alumina fibers, silicon carbide fibers, boron fibers, and basalt fibers. These reinforcing fibers may be used alone, or two or more thereof may be used in combination as appropriate. As the reinforcing fibers, the carbon fibers are preferably used because of the low specific gravity, high strength, and high elastic modulus. Examples of commercially available products of the carbon fiber include "TORAYCA®" T800G-24K, "TORAYCA®" T800S-24K, "TORAYCA®" T700G-24K, "TORAYCA®" T700S-24K, "TORAYCA®" T300-3K, and "TORAYCA®" T1100G-24K (they are manufactured by Toray Industries, Inc.).

Reinforcing fibers subjected to a surface treatment may be used. Examples of the surface treatment include a metal deposition treatment, a treatment with a coupling agent, a treatment with a sizing agent, and an additive attachment treatment. In the present specification, reinforcing fibers to which a surface treatment agent is attached are referred to as reinforcing fibers including the surface treatment agent.

As these reinforcing fibers, those having a surface free energy of 10 to 50 mJ/m$^2$ as measured by a Wilhelmy plate method are preferably used. By controlling the surface free energy in this range, the reinforcing fibers exhibit high affinity with the thermoplastic resins (A) and (B), and exhibit a high joining strength at a boundary region between a thermoplastic resin (A) layer and a thermoplastic resin (B) layer, particularly, at an interface. The surface free energy of the reinforcing fibers is preferably 15 to 40 mJ/m$^2$, and more preferably 18 to 35 mJ/m$^2$. When the surface free energy is less than 10 mJ/m$^2$, the affinity of the reinforcing fibers with the thermoplastic resin (A) or (B) is decreased, and the joining strength is insufficient. When the surface free energy is more than 50 mJ/m$^2$, the reinforcing fibers are aggregated with each other to cause poor dispersion in the fiber-reinforced resin substrate, leading to an increase in variation in joining strength.

A method for controlling the surface free energy of the reinforcing fibers is a controlling method in which the surface is subjected to an oxidation treatment to adjust the number of oxygen-containing functional groups such as carboxyl groups and hydroxyl groups, and a controlling method in which monomers or a plurality of compounds are attached to the surface. When a plurality of compounds are attached to the surface, a mixture of a compound having a high surface free energy and a compound having a low surface free energy may be attached.

The surface free energy can be calculated by measuring contact angles of the reinforcing fibers to three kinds of solvents (purified water, ethylene glycol, and tricresyl phosphate), and then calculating using an Owens approximation formula, and specifically, can be determined by the method described in Examples described below.

The fiber-reinforced resin substrate of the present invention includes reinforcing fibers in a continuous form. That is, the reinforcing fibers can be present in the form of a fiber bundle in which long fiber-reinforced fibers are arranged in one direction, a laminate of fiber bundles, a woven fabric, or the like, and are used in a state of being aligned in a tape shape or a sheet shape, and in the present specification, reinforcing fibers having these forms are collectively referred to as continuous reinforcing fibers. In the case of a reinforcing fiber bundle, the reinforcing fiber bundle may be composed of a plurality of fibers in the same form, or may be composed of a plurality of fibers in the different forms. The number of the reinforcing fibers forming one reinforcing fiber bundle is usually 300 to 60,000 and is preferably 300 to 48,000 and more preferably 1,000 to 24,000, in consideration of production of a substrate.

When the reinforcing fibers have a strand tensile strength, measured in accordance with the resin-impregnated strand test method of JIS R7608 (2007), of 5.5 GPa or more, an excellent interlaminar shear strength between the thermoplastic resin (A) layer and (B) layer is obtained in addition to improvement in dynamic characteristics such as a tensile strength of the fiber-reinforced resin substrate itself, which is preferable. The strand tensile strength is more preferably 5.8 GPa or more.

In the fiber-reinforced resin substrate of the present invention, an amount of the reinforcing fibers per unit area is preferably 30 g/m$^2$. When such an amount of the reinforcing fibers is 30 g/m$^2$ or more, the thermoplastic resin (A) layer and (B) layer can be more strongly composited, and the thermoplastic resin (A) layer and (B) layer can be easily handled in subsequent operations for obtaining a preform and an integrated product. The upper limit of the amount of the reinforcing fibers is not particularly limited, but when the amount thereof is 2,000 g/m$^2$ or less, the thermoplastic resins (A) and (B) can be easily impregnated into the reinforcing fibers, and the lightweight property of the fiber-reinforced resin substrate can be maintained.

The reinforcing fiber volume contents of the thermoplastic resin (A) layer and the thermoplastic resin (B) layer of the present invention are each preferably 30 vol % or more and 90 vol % or less, more preferably 35 vol % or more and vol % or less, and further preferably 40 vol % or more and vol % or less. When the reinforcing fiber volume content is 30 vol % or more, the amount of the resin is not excessively large relative to the amount of the fiber, and the advantage of the fiber-reinforced resin substrate excellent in specific strength and specific elastic modulus is easily obtained. When the reinforcing fiber volume content is 90 vol % or less, resin impregnation failure is unlikely to occur, generation of voids can be suppressed, and a fiber-reinforced resin substrate in which the thermoplastic resin (A) layer and (B) layer are strongly joined can be obtained. The volume content of the reinforcing fibers of each layer can be determined by the method described in Examples described below.

<Thermoplastic Resin (A) and Thermoplastic Resin (B)>

The thermoplastic resin (A) and the thermoplastic resin (B) of the present invention are a combination of "different thermoplastic resins". The term "different" described herein means excluding an aspect in which resins having the same composition as the thermoplastic resin (A) and the thermoplastic resin (B) and also having the same viscosity and melting point are used, that is, a fiber-reinforced resin substrate in which layers of completely the same thermoplastic resin are simply laminated, and the thermoplastic resin (A) and the thermoplastic resin (B) are not basically limited unless such an aspect is adopted. More specifically, the term "different" refers to an aspect in which one grade of a commercially available thermoplastic resin is used as the thermoplastic resin (A) and the thermoplastic resin (B). In the present specification, the term "thermoplastic resin" simply refers to a concept including both thermoplastic resins (A) and (B).

For example, even when resins have the same composition, that is, the same repeating unit, the resins having different viscosities and melting points can be said to be different thermoplastic resins. However, when resins having the same composition are produced by the same production method, they are the same resins even if the viscosity and the melting point are extremely slightly different due to variations in production conditions. Even in the same polyamide, nylon 6 and nylon 66 are different resins.

However, when the thermoplastic resin (A) and the thermoplastic resin (B) are different resin types, the effect of the present invention is further enhanced. The difference in resin type is determined by the identity of the structure characterizing the thermoplastic resin. For example, a polyamide resin is a resin having a repeating unit including an amide bond, and a polyester resin is a resin having a repeating unit including an ester bond, and these are resins having repeating units of different bonds, and thus are determined to be different resin types.

As the thermoplastic resin, generally, a thermoplastic resin having a bond selected from the group consisting of a carbon-carbon bond, an amide bond, an imide bond, an ester bond, an ether bond, a carbonate bond, a urethane bond, a thioether bond, a sulfone bond, and a carbonyl bond in the main chain can be preferably used. The thermoplastic resin may have a partially crosslinked structure. In particular, at least one resin selected from the group consisting of polyamide, polyacetal, polyphenylene sulfide, polyester, polyether ketone, polyether ether ketone, polyarylene ether ketone, polyaramid, and polyether nitrile is sulfide.

The thermoplastic resins may be copolymers or modified products of the resin described above, and/or blended resins of two or more kinds thereof. In the case of using a blended resin of two or more kinds thereof, the resin occupying the largest mass among the resins constituting each thermoplastic resin is the thermoplastic resin. When the resins occupying the largest mass of the resin in each of the thermoplastic resins (A) and (B) are not the same, it is determined that the resin types of the thermoplastic resins (A) and (B) are different from each other.

In the present invention, a difference in melting point between the thermoplastic resin (A) and the thermoplastic resin (B) is preferably 10 to 50° C. In the present specification, the "melting point" and the "glass transition temperature" can be measured by using a differential scanning calorimeter (DSC) based on JIS K7121 (2012). In a sealed sample container having a volume of 50 µl, 1 to 10 mg of a sample is filled, the temperature is raised at a temperature raising rate of 10° C./min, a step on a DSC curve detected in a range of 30 to 400° C. is used as an index of a glass transition temperature, an exothermic peak is used as an index of a melting point, and temperatures are defined as a glass transition temperature and a melting point, respectively.

Hereinafter, for convenience, the resin having a higher melting point in such an aspect will be described as the thermoplastic resin (B). In this case, the melting point of the thermoplastic resin (B) is preferably higher than the melting point of the thermoplastic resin (A) by 30° C. or more. When the difference in melting point is less than 10° C., the thermoplastic resin (B) layer is also melted or thermally deformed under a temperature condition for melting only the thermoplastic resin (A) layer for joining with another member, so that dynamic characteristics as a molded article are deteriorated due to shape deformation of the fiber-reinforced resin substrate, and the joining strength is deteriorated due to disturbance of reinforcing fibers of the fiber-reinforced resin substrate or a change in interface state. From the viewpoint of enhancing the degree of freedom in design such as combination of resins and temperature conditions at the time of joining, the thermoplastic resin (B) has a melting point higher than that of the thermoplastic resin (A) by preferably 40° C. or more and further preferably 45° C. or more. When the difference in melting point between the thermoplastic resin (A) and the thermoplastic resin (B) is 50° C. or less, thermal decomposition of one thermoplastic resin can be suppressed under the temperature condition for melting the other thermoplastic resin.

In particular, the thermoplastic resin (A) is preferably a resin selected from the group consisting of polyarylene ether ketone, polyphenylene sulfide, polyether ether ketone, and polyether ketone ketone, and the thermoplastic resin (B) is also preferably a resin selected from these groups. By selecting such a thermoplastic resin, a fiber-reinforced resin substrate capable of retaining heat resistance and high dynamic characteristics in a high-temperature and high-humidity environment can be obtained. Since polyarylene ether ketone is excellent in chemical resistance and abrasion resistance, and polyphenylene sulfide is excellent in chemical resistance, it is possible to cover the characteristics by combining with other thermoplastic resins inferior in chemical resistance and abrasion resistance.

By combining resins having different properties such as a difference in melting point, a difference in viscosity, and a resin type, instead of the same resin, it is possible to adapt a fiber-reinforced thermoplastic resin to applications and sites that have been difficult to adapt conventionally. When resins or resin types having a difference in melting point are combined, by disposing a low-melting-point resin on the side of a resin layer to be joined with another member, only the resin layer to be joined can be melted, and the appearance of the resin layer on the opposite side can be maintained. When resins or resin types having a difference in viscosity are combined, it is possible to shorten the time for impregnating reinforcing fibers with a resin or resin type having a low viscosity, and thus it is possible to shorten the time for the production process of the fiber-reinforced resin substrate. A fiber-reinforced resin substrate obtained by combining these resins and resin types having different properties is particularly preferably adapted to a position that is a boundary between environments and use conditions, and can be used, for example, at a site in which the inside is exposed to oil, chemicals, steam of high temperature and high humidity, or the like in a cylindrical body such as a pipe, a container, or the like, or a site that is a boundary between use temperatures and requires heat insulation property in a refrigerator, an oven, or the like.

Both the thermoplastic resins (A) and (B) of the present invention have a glass transition temperature of preferably 100° C. or higher, more preferably 150° C. or higher, and further preferably 180° C. or higher, from the viewpoint of good heat resistance and resistance to thermal deformation. The crystalline thermoplastic resin having a glass transition temperature of 100° C. or higher may include, for example, polyketone, polyether ether ketone, polyether ether ketone, polyarylene ether ketones such as polyether ketone ketone, alicyclic polyamides, semi-aromatic polyamides, polyphenylene sulfide, and the like.

Both the thermoplastic resins (A) and (B) are crystalline resins having a melting point of 200° C. or higher from the viewpoint of good heat resistance. The crystalline resin has high dynamic characteristics, and can be continuously used for a long time even in a high-temperature environment required for aircraft applications and the like. Among them, the melting points of the thermoplastic resins (A) and (B) are each preferably 250° C. or higher, more preferably 300° C. or higher, and further preferably 350° C. or higher. The upper limit of the melting point is not particularly limited, and is 400° C. in normal thermoplastic resins.

The thermoplastic resins (A) and (B) of the present invention preferably have a thermal decomposition start temperature of 480° C. or higher, more preferably 500° C. or higher, and further preferably 550° C. or higher, from the viewpoint of suppressing heat resistance in integration with other members and deterioration of physical properties in a high-temperature environment when used as an integrated product.

In order to improve impact resistance, an elastomer or a rubber component may be added to the thermoplastic resin. Other fillers and additives may be appropriately included depending on the use or the like as long as the object of the present invention is not impaired. Examples thereof include inorganic fillers, flame retardants, conductivity imparting agents, crystal nucleating agents, ultraviolet absorbers, antioxidants, damping agents, antibacterial agents, insect repellents, deodorants, coloring inhibitors, heat stabilizers, mold release agents, antistatic agents, plasticizers, lubricants, coloring agents, pigments, dyes, foaming agents, antifoaming agents, and coupling agents.

In the fiber-reinforced resin substrate of the present invention, the basis weight of each of the thermoplastic resins (A) and (B) forming each layer is preferably 10 g/m$^2$ or more. When the basis weight of each resin is 10 g/m$^2$ or more, it is possible to form a boundary region between the thermoplastic resin (A) layer and (B) layer, particularly, an interface where the thermoplastic resin (A) layer and (B) layer are in contact with each other can be formed, and a sufficient thickness for exhibiting an excellent joining strength is obtained, which is preferable. A sufficient thickness of the layer for integration with another member is obtainable. The basis weight is more preferably 20 g/m$^2$ or more, and further preferably 50 g/m$^2$ or more. An upper limit value is not particularly limited, but is preferably 1000 g/m$^2$ or less in order to obtain a fiber-reinforced resin substrate in which an amount of the thermoplastic resin is not excessively large as compared with the amount of the reinforcing fibers and which is excellent in specific strength and specific elastic modulus. Here, the basis weight refers to a mass (g) of the thermoplastic resin included per 1 m$^2$ of the fiber-reinforced resin substrate.

<Fiber-Reinforced Resin Substrate>

In the fiber-reinforced resin substrate of the present invention, the thermoplastic resin (A) and the thermoplastic resin (B) different from the thermoplastic resin (A) are impregnated into the continuous reinforcing fibers, the thermoplastic resin (A) layer made of the thermoplastic resin (A) is exposed at one surface, and the thermoplastic resin (B) layer made of the thermoplastic resin (B) is exposed at the other surface. The thermoplastic resin (A) layer and the thermoplastic resin (B) layer form a boundary region.

Figure 3:
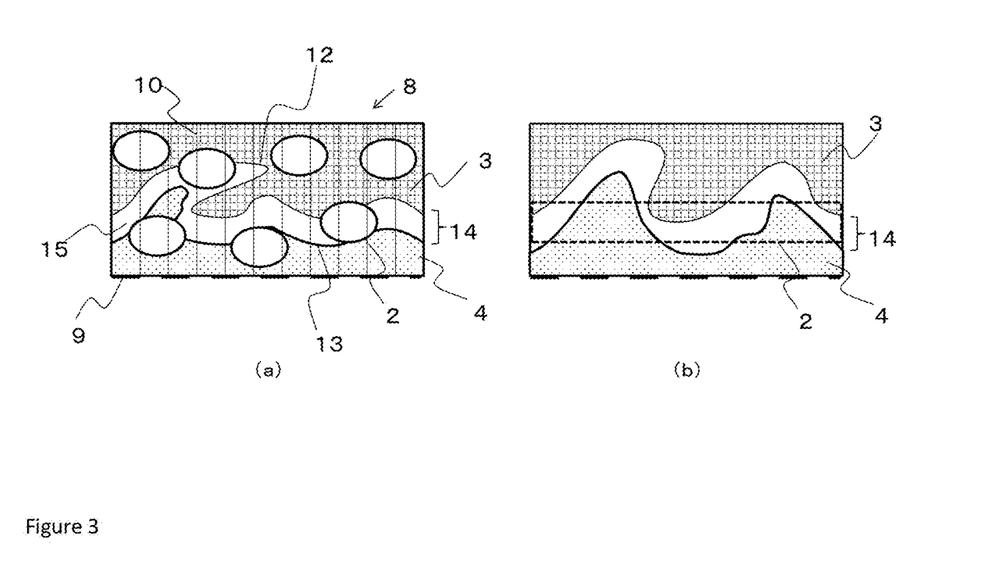
FIG. 3 is a schematic view of an observation cross section perpendicular to a plane of the fiber-reinforced resin substrate according to the present invention, where

At least some of the continuous reinforcing fibers exist across the boundary region between the thermoplastic resin (A) layer and the thermoplastic resin (B) layer. The "boundary region" described herein is a region including a surface of a fiber-reinforced substrate 1 opposite to a surface of a thermoplastic resin (A) layer 3 illustrated in FIG. 3, that is, a facing surface 12 of the thermoplastic resin (A) layer and a surface opposite to a surface of a thermoplastic resin (B) layer 4 in FIG. 3, that is, a facing surface 13 of the thermoplastic resin (B) layer and air (air gap) 15 therebetween in FIG. 3. This facing surface is a surface in contact with the resin layer and air (air gap) or the facing surface of the other resin.

The expression "exist across the boundary region" is illustrated with reference to FIGS. 3(a) and 3(b). In FIG. 3(b), reinforcing fibers 2 (indicated by dotted lines) exist in both layers of the thermoplastic resin (A) layer 3 and the thermoplastic resin (B) layer 4, that is, the reinforcing fibers 2 exist across a boundary region 14 present between the resin layers. The existence of the reinforcing fibers 2 across the boundary region 14 physically joins the thermoplastic resin (A) layer 3 and the thermoplastic resin (B) layer 4 via the reinforcing fibers 2.

Figure 4:
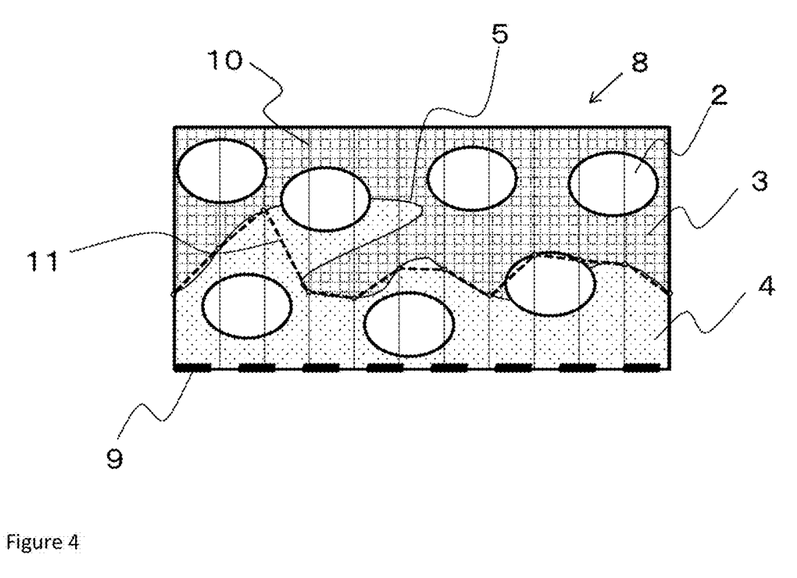
FIG. 4 is a schematic view of an observation cross section perpendicular to the plane of the fiber-reinforced resin substrate according to the present invention, and helps to explain a method for measuring an average roughness length RSm and an average roughness height Rc.

In particular, as illustrated in FIG. 4, it is preferable that the thermoplastic resin (A) layer 3 and the thermoplastic resin (B) layer 4 are joined to each other by forming an interface 5 because the thermoplastic resins are chemically or/and physically joined to each other. The expression "joined to each other by forming an interface" means a state where the thermoplastic resin (A) layer 3 and the thermoplastic resin (B) layer 4 are formed in contact with each other without air (air gap) being included in the boundary region 14, and means that the facing surfaces of the respective resin layers, that is, the facing surface 12 of the thermoplastic resin (A) layer and the facing surface 13 of the thermoplastic resin (B) layer are in close contact with each other.

The expression "joined to each other by forming an interface" is illustrated with reference to FIG. 4. In an observation image 8 of FIG. 4, the thermoplastic resin (A) layer 3 made of the thermoplastic resin (A) is joined to the thermoplastic resin (B) layer 4 by forming the interface 5. A plurality of continuous reinforcing fibers 2 exist on the interface 5. A state where the thermoplastic resin (A) layer 3 and the thermoplastic resin (B) layer 4 are brought into contact with each other around the reinforcing fibers as described above can refer to a state where the reinforcing fibers "exist across the interface".

The existence of the continuous reinforcing fibers in both resin layers across the interface improves the joining strength between the thermoplastic resin layers. When the continuous reinforcing fibers existing on the interface are chemically or/and physically joined with the thermoplastic resin (A) and the thermoplastic resin (B), the adhesive force between the thermoplastic resin (A) layer and the thermoplastic resin (B) layer is improved. The number of continuous reinforcing fibers existing on the interface is preferably 4 or more in an observation range of 500 μm×500 μm described below, from the viewpoint of exhibiting strong joining between the thermoplastic resin (A) layer and the thermoplastic resin (B) layer, more preferably 10 or more, and further preferably 30 or more. The upper limit number is not particularly limited, but is preferably 200 or less from the viewpoint of exhibiting a strong joining strength, suppressing excessive orientation of reinforcing fibers, and obtaining a fiber-reinforced resin substrate having a good appearance.

Figure 1:
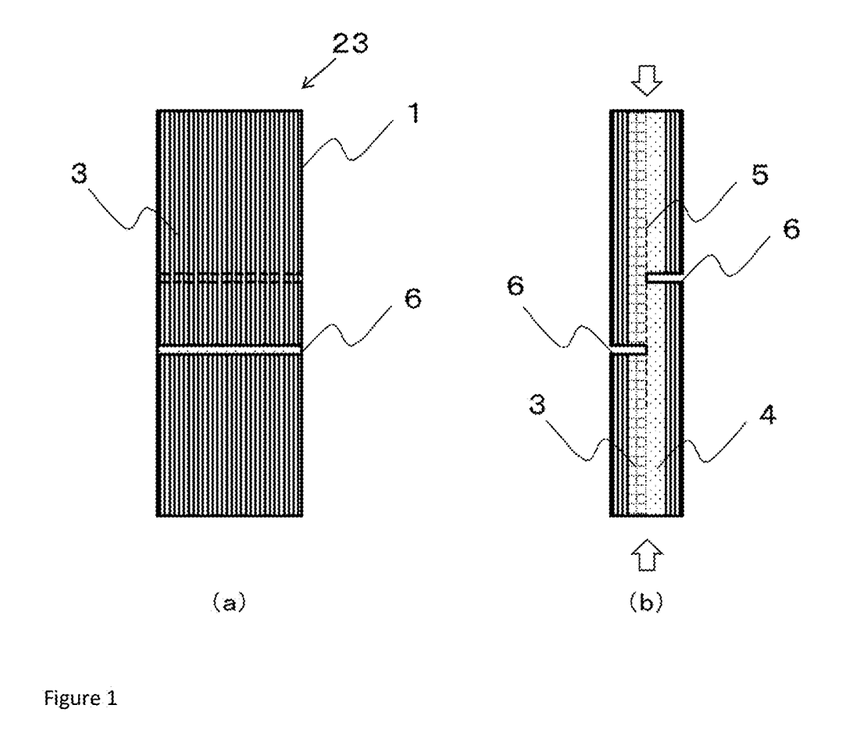
FIG. 1 helps to explain a method for measuring an interlaminar shear strength between a thermoplastic resin (A) layer and a thermoplastic resin (B) layer of a fiber-reinforced resin substrate according to the present invention, where reinforcing fibers are omitted.

In the fiber-reinforced resin substrate of the present invention, an interlaminar shear strength between the thermoplastic resin (A) layer and the thermoplastic resin (B) layer as measured according to JIS K7092 (2005) is preferably 30 MPa or more. By having such an interlaminar shear strength, it is possible to obtain an integrated product in which members made of different thermoplastic resins are strongly joined to each other. The interlaminar shear strength is more preferably 40 MPa or more and further preferably 50 MPa or more. The upper limit value of the interlaminar shear strength is not particularly limited, but is sufficient to be 100 MPa or less. The interlaminar shear strength can be measured by the method described in Examples described below using a notched test piece 23 having a notch 6 formed so as to reach the interface 5 of the fiber-reinforced resin substrate 1 as illustrated in FIG. 1.

For the fiber-reinforced resin substrate of the present invention, it is possible to simultaneously evaluate the adhesive forces in a fiber axis direction and a direction perpendicular to the fiber axis direction by observing a mode of the resin layers at the interface in a cross section perpendicular to a plane of the fiber-reinforced resin substrate including the continuous reinforcing fibers, from a direction at 45 degrees, either clockwise or counterclockwise, to the fiber direction of any continuous reinforcing fibers, that is, in a cross section obtained by cutting the fiber-reinforced resin substrate perpendicular to the planar direction of the fiber-reinforced resin substrate, in a plan view of the fiber-reinforced resin substrate.

In the fiber-reinforced resin substrate of the present invention, it is preferable that the profile curve formed by the interface between the both resin layers has an average roughness length RSm, defined in JIS B0601 (2001), of 100 μm or less, and an average roughness height Rc of 3.5 μm or more. When RSm is 100 μm or less, not only a chemical or/and physical joining force but also a mechanical joining force due to mutual intrusion of the respective resin layers is applied, and the thermoplastic resin (A) layer and the thermoplastic resin (B) layer are less likely to be peeled from each other. The lower limit value of RSm is not particularly limited but is preferably 15 μm or more from the viewpoint of avoiding decrease in the mechanical joining force due to stress concentration. When Rc of the profile curve is 3.5 μm or more, not only mechanical joining force due to entanglement but also continuous reinforcing fibers existing on the interface are chemically and/or physically joined to the thermoplastic resin (A) and the thermoplastic resin (B), and therefore adhesive force between the thermoplastic resin (A) layer and the thermoplastic resin (B) layer is improved. A preferable range of Rc is 10 μm or more, in which the continuous reinforcing fibers are easily included in both the resin layers and thus the adhesive force is further improved, and particularly preferably 20 μm or more. The upper limit value of Rc is not particularly limited but is preferably 100 μm or less from the viewpoint of avoiding a decrease in mechanical joining force due to stress concentration.

Here, known methods can be used for measuring the average roughness height Rc and the average roughness length RSm of the profile curve. Examples thereof may include a method in which measurement is performed from a cross-sectional image obtained using an X-ray CT, a method in which measurement is performed from an elemental analysis mapping image by using an energy dispersive X-ray spectrometer (EDS), and a method in which measurement is preformed from a cross-sectional observation image by using an optical microscope, a scanning electron microscope (SEM), or a transmission electron microscope (TEM). In the observation, the thermoplastic resin (A) and/or the thermoplastic resin (B) may be dyed to adjust the contrast. In the image obtained by any of the methods described above, the average roughness height Rc and the average roughness length RSm of the profile curve are measured in a range of 500 μm×500 μm. The calculation of Rc and RSm from the cross-sectional observation image can be performed by the method described in Examples described below.

As a method for setting the average roughness height Rc and the average roughness length RSm of the profile curve of the present invention in preferable ranges, in a step of impregnating a thermoplastic resin into continuous reinforcing fibers, the viscosity of the thermoplastic resin can be reduced by, for example, increasing the time of pressurization by, for example, increasing the number of nip rolls to be pressurized, increasing the pressure to be applied, or setting the surface temperature of a member to be heated and pressurized such as a nip roll to be high.

The thickness of the fiber-reinforced resin substrate of the present invention is preferably 500 μm or less, more preferably 400 μm or less, and further preferably 300 μm or less, from the viewpoint of handleability and exhibiting a strong joining strength when the fiber-reinforced resin substrate is used for joining a plurality of members. The lower limit value of the thickness is not particularly limited, but when the thickness is 20 μm or more, handling is also good, which is preferable.

The thickness of the thermoplastic resin (A) layer in the fiber-reinforced resin substrate is preferably 20 to 80% of the thickness of the fiber-reinforced resin substrate. From the viewpoint of suppressing warpage, the thickness can also be adjusted from the relationship of the molding shrinkage rate of the resin to be used. Since it is possible to more easily melt the resin layer as the thickness is thinner, the ratio of the thickness of the resin layer to be melted can be reduced in a short time or the ratio of the thickness can also be increased in order to make it difficult to melt the resin layer.

<Preform>

The fiber-reinforced resin substrate of the present invention can be laminated with a metal member, a fiber-reinforced thermosetting resin member using a thermosetting resin as a matrix resin, a fiber-reinforced thermoplastic resin member using a thermoplastic resin as a matrix resin, or the like to form a preform. In particular, when a member A having a thermoplastic resin (A) on a surface thereof and a member B having a thermoplastic resin (B) on a surface thereof are joined, the effect of the present invention can be maximally exhibited by forming a preform in which the fiber-reinforced resin substrate of the present invention is disposed between these members such that the thermoplastic resin (A) layer and the thermoplastic resin (B) layer of the fiber-reinforced resin substrate are in contact with the thermoplastic resin (A) of the member A and the thermoplastic resin (B) of the member B, respectively.

<Integrated Product>

A plurality of members can be joined with the fiber-reinforced resin substrate of the present invention interposed therebetween to form an integrated product. Typically, such an integrated product can be obtained by heating and pressurizing the preform described above using a molding method described below.

In particular, the effect of the present invention can be maximally exhibited by an integrated product obtained by welding a member A having a thermoplastic resin (A) on a surface thereof and a member B having a thermoplastic resin (B) on a surface thereof with the fiber-reinforced resin substrate interposed therebetween such that the thermoplastic resin (A) layer and the thermoplastic resin (B) layer of the fiber-reinforced resin substrate are welded to the thermoplastic resin (A) of the member A and the thermoplastic resin (B) of the member B, respectively. In a preferred embodiment, one or both of the member (A) and the member (B) are fiber-reinforced resins, and in this case, a molded article having an excellent strength can be obtained as a whole integrated product. At this time, from the viewpoint of suppressing thermal decomposition of the thermoplastic resin, a method of joining the fiber-reinforced resin substrate and one of the member A and the member B and then sequentially integrating the other member, or a method of simultaneously integrating the preform in which the fiber-reinforced resin substrate is disposed between the member A and the member B by heating and pressurizing can be used. At this time, in the fiber-reinforced resin substrate, each resin can also be further impregnated in the inside of the continuous reinforcing fibers to form an interface.

Examples of the method for molding an integrated product of the present invention include thermal welding, vibration welding, ultrasonic welding, laser welding, resistance welding, induction welding, insert injection molding, outsert injection molding, two-color molding, a press molding method, an autoclave molding method, a bagging molding method, a wrapping tape method, an internal pressure molding method, a hand lay-up method, a filament winding method, a pultrusion method, a resin injection molding method, and a resin transfer molding method.

<Method for Producing Fiber-Reinforced Resin Substrate>

The fiber-reinforced resin substrate of the present invention can be produced by, for example, a method of impregnating a thermoplastic resin (A) from one surface of a continuous reinforcing fiber sheet to obtain a semi-preg having a thermoplastic resin (A) layer exposed at one surface and the continuous reinforcing fiber sheet exposed at the other surface; impregnating a thermoplastic resin (B) from the other surface of the semi-preg or impregnating a thermoplastic resin (B) from one surface of the continuous reinforcing fiber sheet to obtain a semi-preg having a thermoplastic resin (B) layer exposed at one surface and the continuous reinforcing fiber sheet exposed at the other surface; and impregnating the thermoplastic resin (A) from the other surface of the semi-preg. At this time, when description is made such that the thermoplastic resin (B) has a melting point higher than that of the thermoplastic resin (A) as described above, the thermoplastic resin (B) having a high melting point is impregnated previously so that the possibility that the thermoplastic resin (B) causes thermal decomposition or thermal deterioration can be reduced by the heating temperature applied to the thermoplastic resin (A) to be impregnated later, which is preferable.

The method of impregnating a thermoplastic resin from one surface is not particularly limited, and the thermoplastic resin can be impregnated by a method of disposing a thermoplastic resin in the form of a film, a nonwoven fabric, or particles on a surface of a continuous reinforcing fiber sheet and performing heating and pressurizing, or applying a thermoplastic resin in a molten state or a liquid state of being dissolved in a solvent to a surface of a continuous reinforcing fiber sheet and performing heating and pressurizing. As a heating method, a known method can be used. For example, a non-contact heating method using a far infrared heater, a high-temperature oven, or induction heating, a method of heating the thermoplastic resin by bringing it into contact with a heated roll or belt, or the like can be mentioned. Especially, a method of heating the thermoplastic resin by passing it through a tank of a far-infrared heater or a high-temperature oven is preferable from the viewpoint of temperature control. A pressurization method is not particularly limited, but examples thereof include a method of pressurizing with a reverse roll, a forward rotating roll, a kiss roll, an applicator, or a belt. When the viscosity of the molten thermoplastic resin is low, pressurization is not necessarily required. There is also mentioned a method of impregnating a thermoplastic resin by reducing the pressure from a surface opposite to a surface on which the thermoplastic resin is disposed or applied.

The method of impregnating a thermoplastic resin from the other surface is not particularly limited, and the same method as the method of impregnating the thermoplastic resin from one surface described above may be used. From the viewpoint of suppressing thermal decomposition or thermal deterioration of the thermoplastic resin impregnated previously, it is possible to arbitrarily adjust the temperature setting for melting or dissolving only the thermoplastic resin to be impregnated from the other surface, the disposing of a heat source only on the other surface side, or the like.

EXAMPLES

Hereinafter, the present invention will be described in more detail with reference to Examples. However, the scope of the present invention is not limited to these Examples. The unit "part" of the composition ratio refers to part by mass unless otherwise noted. Measurements of various properties were performed under an environment in which a temperature was 23° C. and a relative humidity was 50% unless otherwise noted.

<Evaluation and Measurement Method>

(1) Interlaminar Shear Strength of Fiber-Reinforced Resin Substrate

The interlaminar shear strength between the thermoplastic resin (A) layer and the thermoplastic resin (B) layer of the fiber-reinforced resin substrate was measured based on JIS K7092 (2005). In the fiber-reinforced resin substrate of the present invention and the comparative product thereof, the length direction of the test piece and the fiber direction of the continuous reinforcing fiber were the same direction. Prepregs composed of carbon fibers and an epoxy resins were laminated so as to have a thickness of 2 mm, and then press-molded to obtain a cured plate. The surface of the obtained cured plate was roughened with a sand blaster to perform degreasing. An acrylic adhesive was applied to the surface of the cured plate and bonded to both surfaces of the fiber-reinforced resin substrate, and the adhesive was cured to prepare a test plate for measurement. From the obtained test plate, as illustrated in FIG. 1, notches having a width of 1 mm, an interval of 6.4 mm, and a difference depth of 0 to 0.2 mm were formed by a cutting machine so that the notch tips reached the interface between the thermoplastic resin (A) layer side and the thermoplastic resin (B) side in parallel and staggered from both surfaces. Thereafter, the notch was cut into a length of 80 mm and a width of 12.5 mm to obtain a test piece.

A compression test was performed using a test piece subjected to notch processing, and the interlaminar shear strength was calculated from the obtained load and the dimensions of the test piece. The number of tests "n" was set to 5, and the average value was taken as the interlaminar shear strength of the fiber-reinforced resin substrate.

(2) Melting Point and Glass Transition Temperature of Thermoplastic Resin

The melting point and the glass transition temperature of the thermoplastic resin were measured using a differential scanning calorimeter (DSC) based on JIS K7121 (2012). In a sealed sample container having a volume of 50 µl, 1 to 10 mg of a sample was filled, the temperature was raised at a temperature raising rate of 10° C./min, a step on a DSC curve detected in a range of 30 to 400° C. was used as an index of a glass transition temperature, an exothermic peak was used as an index of a melting point, and temperatures were defined as a glass transition temperature and a melting point, respectively.

Figure 2:
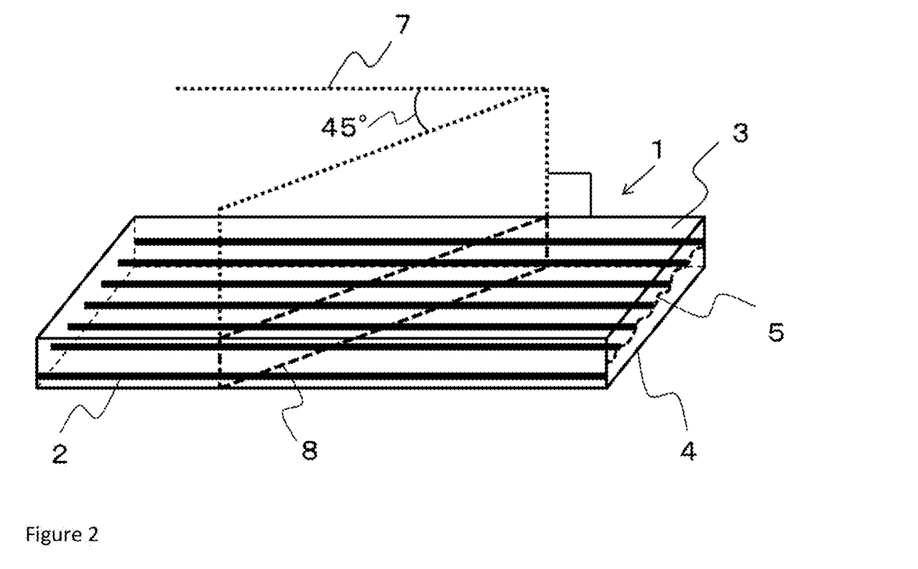
FIG. 2 is a schematic view of the fiber-reinforced resin substrate according to the present invention and helps to explain a method for measuring an average roughness length RSm and an average height Rc of the fiber-reinforced resin substrate.

(3) Average Roughness Length RSm and Average Roughness Height Rc of Fiber-Reinforced Resin Substrate Using the prepared fiber-reinforced resin substrate, as illustrated in FIG. 2, the fiber-reinforced resin substrate was cut perpendicularly to the planar direction of the fiber-reinforced resin substrate at an angle of 45 degrees in a plan view with respect to a fiber direction 7 of the reinforcing fibers 2 included in both resin layers to obtain a test piece having the observation cross section 8. The obtained test piece was embedded in an epoxy resin, and the observation cross section was polished. Ten images at a magnification of 1000 times was photographed using an optical microscope in the obtained observation cross section.

The state in an arbitrary observation range of 500 µm×500 µm in the obtained image is as illustrated in the schematic view of FIG. 4. In this observation screen 8, the thermoplastic resin (A) layer 3 and the thermoplastic resin (B) layer 4 form the interface 5. With an end portion on the thermoplastic resin (B) layer 4 side made of the thermoplastic resin (B) as a baseline 9, vertical baselines are drawn at 5 µm intervals from the thermoplastic resin (B) layer 4 made of the thermoplastic resin (B) toward the thermoplastic resin (A) layer 3 made of the thermoplastic resin (A). Points at which the vertical baseline 10 drawn from the baseline 9 intersects the thermoplastic resin (A) layer 3 for the first time are plotted, and a line connecting the plotted points is defined as a profile curve 11. The obtained profile curve 11 was subjected to a filtering processing in accordance with JIS B0601 (2001), and the average roughness height Rc and the average roughness length RSm of the profile curve 11 were calculated. The average roughness height Rc and the average roughness length RSm were similarly calculated from the obtained ten images, and the average value was taken as each value.

(4) Volume Content of Reinforcing Fibers in Thermoplastic Resin (A) Layer and Thermoplastic Resin (B) Layer A piece of 20 mm squares was cut out of the fiber-reinforced resin substrate, was embedded in an epoxy resin, and was polished so as to cause a perpendicular cross section in the fiber direction of the reinforcing fibers of the fiber-reinforced resin substrate to be a surface to be observed to prepare a sample. The sample was observed with a laser microscope (VK-9510, manufactured by KEYENCE CORPORATION) at a magnification of 400 times to observe the cross section. An observation image was developed onto multi-purpose image analysis software, the cross section of the reinforcing fiber viewed in the observation image was extracted using a program incorporated in the software, and the total area was calculated. Similarly, the area of the thermoplastic resin (A) layer was measured from the outer periphery of the thermoplastic resin (A) layer (range surrounded by both end portions of the observation cross section, the surface of the thermoplastic resin (A) layer, and the interface with the thermoplastic resin (B) layer). From these measured areas, the ratio of the total area of the reinforcing fibers per area of the thermoplastic resin (A) layer was calculated. The same measurement was performed at five surfaces to be observed, and the average value was taken as the volume content of the reinforcing fibers in the thermoplastic resin (A) layer of the present invention. The thermoplastic resin (B) layer was also measured by the same method.

(5) Thickness of Thermoplastic Resin (A) Layer and Ratio to Thickness of Fiber-Reinforced Resin Substrate With the average value of the plot positions of the profile curve used in (3) described above as the boundary between the thermoplastic resin (A) layer and the thermoplastic resin (B) layer, a distance from one surface of the fiber-reinforced resin substrate (surface at which the thermoplastic resin (A) was exposed) to the boundary of the thickness was measured and taken as the thickness of the thermoplastic resin (A) layer. The thickness of the fiber-reinforced resin substrate was measured using a micrometer, and the thickness ratio was calculated from these measured values.

(6) Joining Strength of Integrated Product

The obtained fiber-reinforced resin substrate was disposed as a joint member in a mold 12 as illustrated in FIG. 5(a). On the thermoplastic resin (A) layer side, a carbon fiber-reinforced thermoplastic resin (A) pellet 17 prepared by melt-kneading a thermoplastic resin (A) and carbon fibers (20% by mass) with an extruder was injection-molded, and on the thermoplastic resin (B) layer side, a carbon fiber-reinforced thermoplastic resin (B) pellet 19 prepared by melt-kneading a thermoplastic resin (B) and carbon fibers (20% by mass) with an extruder was injection-molded, so that a test piece 21 for measuring a joining strength of an integrated product was prepared.

A tensile test was performed using the obtained test piece, and the joining strength was calculated from the obtained breaking load and the area of the joint portion. The obtained joining strength was evaluated as follows.

Joining strength of 50 MPa or more or destruction of base material of injection molded member: A Joining strength of 40 MPa or more and less than 50 MPa or destruction of base material of injection molded member: B Joining strength of 30 MPa or more and less than 40 MPa or destruction of base material of injection molded member: C Joining strength of less than 30 MPa: D (failed)

(7) Surface Free Energy of Reinforcing Fiber

First, one single fiber is taken out from a reinforcing fiber bundle using DCAT11 manufactured by DataPhysics Corporation, it is cut into eight pieces having a length of 12±2 mm, and then they are pasted to a special holder FH12 (a flat plate whose surface is coated with a sticky substance) in parallel with gaps between the single fibers of 2 to 3 mm. Thereafter, the tips of the single fibers are cut to the same size and are set in the DCAT11 of the holder. In the measurement, a cell containing each solvent is brought close to the lower ends of the eight single fibers at a speed of 0.2 mm/s, and the single fibers are immersed up to 5 mm from the tips thereof. Thereafter, the single fibers are pulled up at a speed of 0.2 mm/s. This operation is repeated four or more times. The force F received by the single fiber while the single fiber is immersed in the liquid is measured with an electronic balance. Using this value, a contact angle θ is calculated by the following equation.

COS θ=(force F (mN) received by eight single fibers)/((8 (number of single fibers)×circumference (m) of single fibers×surface tension (mJ/m²) of solvent)

The measurement was performed on single fibers extracted from three different points in the reinforcing fiber bundle. That is, with respect to one reinforcing fiber bundle, the average value of the contact angles of 24, in total, of single fibers was determined.

The surface free energy $\gamma_f$ of the reinforcing fiber is calculated as the sum of a polar component $\gamma^p_f$ of the surface free energy and a nonpolar component $\gamma^d_f$ of the surface free energy.

The polar component $\gamma^p_f$ of the surface free energy can be obtained by substituting a component and a contact angle of each liquid into an Owens approximation formula (a formula constituted by a polar component and a nonpolar component of a unique surface tension of each solvent, and a contact angle θ), as shown below, and plotting on X and Y, and then squaring a gradient a obtained by performing a collinear approximation by a method of least squares. The nonpolar component $\gamma^d_f$ of the surface free energy is obtained by squaring a slice b. The surface free energy $\gamma_f$ of the reinforcing fiber is the sum of the square of the gradient a and the square of the slice b.

Y=a·X+b
X=√(polar component of surface tension (mJ/m²) of solvent)/√(nonpolar component of surface tension (mJ/m²) of solvent)
Y=(1+COS θ)·(polar component of surface tension (mJ/m²) of solvent)/2√nonpolar component of surface tension (mJ/m²) of solvent
Polar component $\gamma^p_f$ of surface free energy of reinforcing fiber=a²
Nonpolar component $\gamma^d_f$ of surface free energy of reinforcing fiber=b²
Total surface free energy $\gamma_f$=a²+b².

The polar component and nonpolar component of the surface tension of each solvent are as follows.
Purified water
Surface tension: 72.8 mJ/m², Polar component: 51.0 mJ/m², Nonpolar component: 21.8 mJ/m²
Ethylene glycol
Surface tension: 48.0 mJ/m², Polar component: 19.0 mJ/m², Nonpolar component: 29.0 mJ/m²
Tricresol phosphate
Surface tension: 40.9 mJ/m², Polar component: 1.7 mJ/m², Nonpolar component: 39.2 mJ/m²

(8) Interlaminar Shear Strength of Fiber-Reinforced Resin Substrate in Integrated Product In an integrated product obtained by integrating the obtained fiber-reinforced resin substrate as a joint member with another member, the thickness was adjusted by a method such as cutting or polishing so that the thickness of the other member on the thermoplastic resin (A) side and the thermoplastic resin (B) side of the fiber-reinforced resin substrate was 2 mm, thereby preparing a test plate. From the obtained test plate, as illustrated in FIG. 1, notches having a width of 1 mm, an interval of 6.4 mm, and a difference depth of 0 to 0.2 mm were formed by a cutting machine so that the notch tips reached the interface between the thermoplastic resin (A) layer side and the thermoplastic resin (B) side in parallel and staggered from both surfaces. Thereafter, the notch was cut into a length of 80 mm and a width of 12.5 mm to obtain a test piece.

A compression test was performed using a test piece subjected to notch processing, and the interlaminar shear strength was calculated from the obtained load and the dimensions of the test piece. The number of tests "n" was set to 5, and the average value was taken as the interlaminar shear strength of the fiber-reinforced resin substrate in the integrated product.

(9) Thermal Decomposition Start Temperature of Thermoplastic Resin

The thermal decomposition start temperature of the thermoplastic resin was measured in a dry air atmosphere at a temperature region of 50 to 600° C. and a temperature raising rate of 10° C./min using a thermogravimetric analyzer (TG-DTA) based on JIS K7120 (1987). At this time, 5 to 15 mg of the thermoplastic resin was taken out by, for example, scraping the thermoplastic resin from the pellets or powder used for each resin layer or the fiber-reinforced resin substrate, and placed in a platinum container, and measurement was performed. From the obtained TG curve, the "start temperature Ti" at which the mass change started was defined as the thermal decomposition start temperature of each thermoplastic resin.

(10) Joining Strength in High-Temperature Atmosphere of Integrated Product

The joining strength in a high-temperature atmosphere was evaluated in the same manner as in (6) Joining Strength of Integrated Product described above, except that the space to be evaluated was surrounded by a thermostatic bath and the ambient temperature was set to 150° C. After the test piece was disposed in the apparatus, a tensile test was performed 5 minutes after the ambient temperature of the thermostatic bath returned to 150° C., and the joining strength was calculated from the obtained breaking load and the area of the joint portion. The obtained joining strength was evaluated as follows. Rank E was rated as failed.

Exhibiting a joining strength of 90% or more as compared with the joining strength in (6): A
Exhibiting a joining strength of 70 or more and less than 90% as compared with the joining strength in (6): B
Exhibiting a joining strength of 50% or more and less than 70% as compared with the joining strength in (6): C
Exhibiting a joining strength of 40% or more and less than 50% as compared with the joining strength in (6): D
Exhibiting a joining strength of less than 40% as compared with the joining strength in (6): E Materials Used in Examples and Comparative Examples Reinforcing fibers, a thermoplastic resin (A), and a thermoplastic resin (B) shown below were used. The materials used in each of Examples and Comparative Examples are as shown in Tables 1 to 3.

(1) Reinforcing Fiber

An acrylonitrile copolymer copolymerized with itaconic acid was spun and fired to obtain carbon fibers having a total number of filaments of 24,000 and a specific gravity of 1.8, and having different strand strengths and strand elastic moduli.

CF-1: Strand tensile strength: 5.9 GPa, Strand elastic modulus: 290 GPa
CF-2: Strand tensile strength: 4.9 GPa, Strand elastic modulus: 230 GPa (2) Thermoplastic Resin (A) and Thermoplastic Resin (B)

TP-2: Film including PEEK (polyether ether ketone), PEEK 450G (manufactured by Victrex plc, crystalline, melting point: 343° C., glass transition temperature: 143° C., thermal decomposition start temperature: 480° C.) and having a basis weight of 120 g/m$^2$ TP-3: Film including PPS (polyphenylene sulfide), crystalline, melting point: 284 [° C.], glass transition temperature: 90° C., thermal decomposition start temperature: 460° C. and having a basis weight of 120 g/m$^2$ TP-5: Film including a resin (crystalline, melting point: 165 [° C.], thermal decomposition start temperature: 310° C.) obtained by blending modified PP, 80% by mass of an unmodified polypropylene resin ("Prime Polypro®" J105G manufactured by PRIME POLYMER Co, Ltd.), and 20% by mass of an acid-modified polypropylene resin ("ADMER" QB510 manufactured by Mitsui Chemicals, Inc.) and melting and kneading the blended product using a twin-screw extruder and having a basis weight of 120 g/m$^2$ TP-6: Film including a resin (crystalline, melting point: 273[° C.], glass transition temperature: 85° C., thermal decomposition start temperature: 450° C.) obtained by blending modified PPS, 95% by mass of PPS of TP-3, and 5% by mass of aliphatic polycarbodiimide "CARBODILITE®" and melting and kneading the blended product using a twin-screw extruder and having a basis weight of 120 g/m$^2$ TP-7: Film including PEKK1 (polyether ketone ketone), crystalline, melting point: 300° C., glass transition temperature: 160° C., volume melting flow rate: 34 cm$^3$/min @380° C., thermal decomposition start temperature: 490° C. and having a basis weight of 120 g/m$^2$ TP-8: Film including PEKK2 (polyether ketone ketone), crystalline, melting point: 332° C., glass transition temperature: 162° C., volume melting flow rate: 34 cm$^3$/min @380° C., thermal decomposition start temperature: 510° C. and having a basis weight of 120 g/m$^2$ TP-9: Film including PEKK3 (polyether ketone ketone), crystalline, melting point: 332° C., glass transition temperature: 162° C., volume melting flow rate: 68 cm$^3$/min @380° C., thermal decomposition start temperature: 510° C. and having a basis weight of 120 g/m$^2$ TP-10: Film including PA6 (polyamide 6), crystalline, melting point: 215° C., glass transition temperature: 150° C., thermal decomposition start temperature: 330° C. and having a basis weight of 120 g/m$^2$ (3) Compound (a)

a-1: Sorbitol polyglycidyl ether (EX614B, manufactured by Nagase ChemteX Corporation)

a-2: Diglycerol polyglycidyl ether (EX421, manufactured by Nagase ChemteX Corporation)

a-3: Polyglycerol polyglycidyl ether (EX521, manufactured by Nagase ChemteX Corporation)

a-4: Polyethylene glycol diglycidyl ether (Number of ethylene oxides: 13, manufactured by Nagase ChemteX Corporation)

a-5: Bisphenol A-ethylene oxide 15 mol adduct (4) Compound (b)

b-1: PO-modified polyethyleneimine (PP061, manufactured by Nippon Shokubai Co., Ltd.)

b-2: Polyallylamine (PAA-01, manufactured by Nippon Shokubai Co., Ltd.)

b-3: Polyethyleneimine (SP-012, manufactured by Nippon Shokubai Co., Ltd.)

(5) Compound (c)

C-1: Ethylene glycol diglycidyl ether (EX-810, manufactured by Nagase ChemteX Corporation)

C-2: Bisphenol A type diglycidyl ether (jER828, manufactured by Mitsubishi Chemical Corporation).

Example 1

The compound a-4 was mixed with acetone to obtain a solution having the compound uniformly dissolved in a concentration of about 1% by mass. The reinforcing fibers CF-1 were immersed in this solution and then heat-treated at 210° C. for 90 seconds. At this time, the adhesion amount of the compound a-4 was adjusted to 0.5 parts by mass based on 100 parts by mass of the reinforcing fibers CF-1, thereby preparing continuous reinforcing fibers.

While a reinforcing fiber sheet (basis weight: 193 g/m$^2$) in which the continuous reinforcing fibers were aligned in one direction, was drawn and run in one direction, TP-8 as the thermoplastic resin (B) was disposed on one surface of the continuous reinforcing fiber sheet and heated by an IR heater to melt the thermoplastic resin (B), so that the thermoplastic resin (B) was attached to one entire surface of the continuous reinforcing fiber sheet, and the thermoplastic resin impregnated into the reinforcing fiber sheet by pressurization with three pairs of nip rolls maintained at a temperature lower than the melting point of the thermoplastic resin (B) by 100° C. (232° C. that was lower than the melting point of TP-8 by 100° C. in Example 1) was cooled, thereby obtaining a semi-preg in which the fiber-reinforced sheet was exposed at the other surface. TP-7 as the thermoplastic resin (A) was disposed on the other surface of the obtained semi-preg and heated by an IR heater to melt the thermoplastic resin (A), so that the thermoplastic resin (A) was attached to the surface of the semi-preg. The thermoplastic resin (A) was impregnated into a fiber-reinforced resin intermediate by pressurization with three pairs of nip rolls maintained at a temperature lower than the melting point of the thermoplastic resin (A) by 100° C. (200° C. that was lower than the melting point of TP-7 by 100° C. in Example 1) and cooled, thereby obtaining a fiber-reinforced resin substrate.

Figure 5:
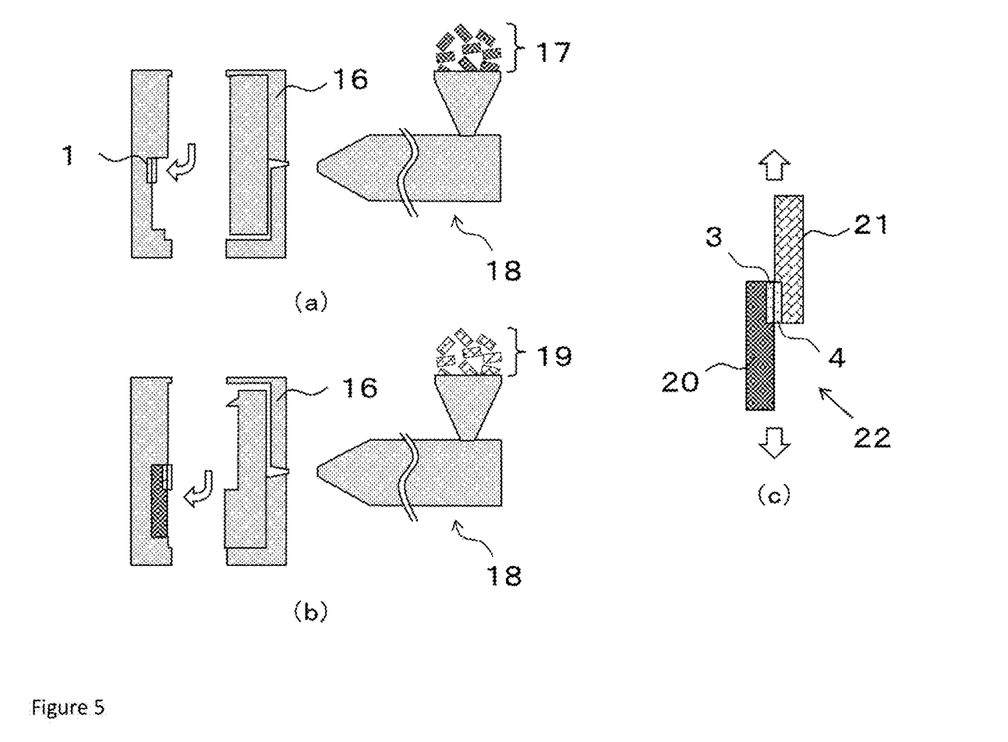
FIG. 5 is a schematic view of a method for preparing a joining strength test piece of an integrated product according to the present invention.

The obtained fiber-reinforced resin substrate was disposed as a joint member in a mold 16 as illustrated in FIG. 5(*a*). On the thermoplastic resin (A) layer side, a carbon fiber-reinforced thermoplastic resin (A) pellet 17 prepared by melt-kneading a thermoplastic resin (A) and carbon fibers (20% by mass) with an extruder was injection-molded, and on the thermoplastic resin (B) layer side, a carbon fiber-reinforced thermoplastic resin (B) pellet 19 prepared by melt-kneading a thermoplastic resin (B) and carbon fibers (20% by mass) with an extruder was injection-molded, so that an integrated product was obtained.

The evaluation results of the fiber-reinforced resin substrate and integrated product thus obtained are shown in Table 1.

Examples 2 to 10

A fiber-reinforced resin substrate was obtained by the same method as in Example 1, except that the compound to be imparted to the reinforcing fibers was changed as described in Table 1. The evaluation results of the fiber-reinforced resin substrate and integrated product thus obtained are shown in Table 1.

When Examples 1 to 10 were compared with each other, as the surface free energy of the reinforcing fiber is higher, preferable properties are shown in which the interlaminar shear strength between the two resins is improved, and the joining strength of the integrated product thus obtained is also improved.

Example 11

A fiber-reinforced resin substrate was obtained by the same method as in Example 1, except that the reinforcing fibers CF-2 having different strand tensile strengths were used as described in Table 2. The evaluation results of the fiber-reinforced resin substrate and integrated product thus obtained are shown in Table 2.

When Example 1 and Example 11 were compared with each other, it is found that when the strand tensile strength of the reinforcing fiber is high, the interlaminar shear strength between the two resins is improved, and the joining strength of the integrated product thus obtained is also improved.

Examples 12 to 17

A fiber-reinforced resin substrate was obtained in the same manner as in Example 1, except that a thermoplastic resin used in the thermoplastic resin (A) and/or the thermoplastic resin (B) was changed as described in Table 2. The heating temperature with the nip roll was set to a temperature lower than the melting point of the thermoplastic resin used in each Example by 100° C. The evaluation results of the fiber-reinforced resin substrate and integrated product thus obtained are shown in Table 2.

Even when the combination of the thermoplastic resins in Example 1 and Examples 12 to 17 was changed, an integrated product having a high joining strength could be obtained.

Example 18

A fiber-reinforced resin substrate was obtained in the same manner as in Example 1, except that a reinforcing fiber sheet having a basis weight of 250 g/m$^2$ was used. The evaluation results of the fiber-reinforced resin substrate and integrated product thus obtained are shown in Table 2.

When Example 1 and Example 18 were compared with each other, as the volume content of the reinforcing fiber is increased, preferable properties are shown in which the interlaminar shear strength between the two resins is improved, and the joining strength of the integrated product thus obtained is also improved.

Example 19

A fiber-reinforced resin substrate was obtained in the same manner as in Example 1, except that in the step of drawing a reinforcing fiber sheet in which the continuous reinforcing fibers were arranged in one direction and impregnating the reinforcing fiber sheet into a reinforcing fiber sheet in which the thermoplastic resin (A) and the thermoplastic resin (B) run in one direction, the running speed of the reinforcing fiber sheet was doubled. When the running speed of the reinforcing fiber sheet was doubled, the time during which each thermoplastic resin was impregnated into the reinforcing fiber sheet was shortened, so that the obtained fiber-reinforced resin substrate was in a state where each thermoplastic resin was not completely impregnated into the central portion of the reinforcing fiber sheet and a boundary region having air gaps was formed between the facing surfaces of the respective resin layers.

Subsequently, the thermoplastic resin TP-7 and the carbon fibers TP-1, and the thermoplastic resin TP-8 and the carbon fibers TP-1 were melt-kneaded with an extruder to prepare a carbon fiber-reinforced thermoplastic resin (A) pellet and a carbon fiber-reinforced thermoplastic resin (B) pellet (corresponding to the carbon fiber-reinforced thermoplastic resin pellets 17 and 19 in FIG. 5). Injection molding was performed using these carbon fiber-reinforced thermoplastic resin pellets to obtain a flat plate made of a carbon fiber-reinforced thermoplastic resin. The flat plate obtained from the carbon fiber-reinforced thermoplastic resin (A) pellet, the fiber-reinforced resin substrate obtained in Example 19, and the flat plate obtained from the carbon fiber-reinforced thermoplastic resin (B) pellet were sequentially stacked, heated and pressurized by a press molding machine with heating platen temperature of 360° C., and cooled in a pressurized state to obtain an integrated product. At this time, the thermoplastic resin (A) layer of the fiber-reinforced resin substrate and the flat plate obtained from the carbon fiber-reinforced thermoplastic resin (A) pellet were disposed in contact with each other.

The obtained integrated product was subjected to notch processing, and a compression test was performed using a test piece. The obtained results are shown in Table 3.

Comparative Example 1

While a reinforcing fiber sheet having a basis weight (97 g/m$^2$) in which the continuous reinforcing fibers were aligned in one direction, was drawn and run in one direction, TP-7 as the thermoplastic resin (A) was disposed one surface of the continuous reinforcing fiber sheet and heated by an IR heater to melt the thermoplastic resin (A), so that the thermoplastic resin (A) was attached to one entire surface of the continuous reinforcing fiber sheet and pressurized with nip rolls maintained at a temperature lower than the melting point of the thermoplastic resin (A) by 100° C., thereby obtaining a fiber-reinforced resin substrate including only the thermoplastic resin (A) in which the thermoplastic resin was completely impregnated into the reinforcing fiber sheet. A fiber-reinforced resin substrate including only the thermoplastic resin (B) was obtained in the same method, except that TP-7 as the thermoplastic resin (A) was changed to TP-8 as the thermoplastic resin (B). The obtained two types of fiber-reinforced resin substrates were laminated, heated by an IR heater to melt the thermoplastic resin (B), and pressurized with nip rolls maintained at a temperature lower than the melting point of the thermoplastic resin (B) by 100° C. to integrate the two types of fiber-reinforced resin substrates, thereby obtaining a fiber-reinforced resin substrate. The evaluation results of the obtained fiber-reinforced resin substrate are shown in Table 3.

Comparative Example 2

A laminate of thermoplastic resin films in which TP-7 as the thermoplastic resin (A) and TP-8 as the thermoplastic resin (B) were superposed on each other without using continuous reinforcing fibers was heated by an IR heater to melt the thermoplastic resin (A), and the thermoplastic resin (A) was attached to the surface of the thermoplastic resin (B). The obtained product was pressurized with three pairs of nip rolls maintained at a temperature (200° C.) lower than the melting point of the thermoplastic resin (A) by 100° C., thereby obtaining a thermoplastic resin film having a two-layer structure.

The evaluation results of the obtained thermoplastic resin film are shown in Table 3.

When Example 1, Comparative Example 1, and Comparative Example 2 were compared with each other, the same type of thermoplastic resin was used, but a high interlaminar shear strength could not be exhibited because there was no reinforcing fibers existing across the boundary region formed by both the thermoplastic resins. An integrated product could be obtained using these materials, but did not have a sufficient joining strength.

Comparative Example 3

A fiber-reinforced resin substrate was obtained in the same manner as in Example 1, except that a thermoplastic resin used in the thermoplastic resin (A) and/or the thermoplastic resin (B) was changed as described in Table 3. The heating temperature with the nip roll was set to a temperature lower than the melting point of the used thermoplastic resin by 100° C. The properties of the obtained fiber-reinforced resin substrate are shown in Table 3.

When Example 1 and Comparative Example 3 were compared with each other, since a thermoplastic resin having a melting point of 200° C. or lower was used, the joining strength in a high-temperature atmosphere could not be maintained, and the thermoplastic resin was unsuitable for use in a high-temperature environment.

Reference Example 1

Injection molding was performed only the carbon fiber-reinforced thermoplastic resin (A) pellet in the same manner as in Example 1, except that the fiber-reinforced resin substrate was not used as a joint member to prepare a molded member (A) in which the fiber-reinforced resin substrate was not integrated. Next, as illustrated in FIG. 5(b), the molded member (A) was disposed in the mold 16, and then injection molding was performed using the carbon fiber-reinforced thermoplastic resin (B) pellet to prepare a test piece for a joining strength of an integrated product.

In Reference Example 1, an integrated product could be obtained, but the integrated product did not have a sufficient joining strength, the joining strength of the integrated product was evaluated as D, and the joining strength of the integrated product in a high-temperature atmosphere was evaluated as C.

TABLE 1

|  |  | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Fiber-reinforced resin substrate |  |  |  |  |  |  |  |  |  |  |  |
| Reinforcing fiber |  | CF-1 | | | | | | | | | |
| Strand tensile strength |  | 5.9 | | | | | | | | | |
| Surface free energy |  | 20 | 32 | 22 | 28 | 19 | 18 | 32 | 33 | 16 | 9 |
| Compound |  | — | a-4 | a-1 | a-2 | a-3 | a-5 | b-1 | b-2 | b-3 | c-1 | c-2 |
| Thermoplastic resin (A) |  |  |  |  |  |  |  |  |  |  |  |
| Resin type | — | TP-7 (PEKK1) | | | | | | | | | |
| Crystalline/amorphous | — | Crystalline | | | | | | | | | |
| Tm(a)/Tg(a) | ° C. | 300/160 | | | | | | | | | |
| Volume content | Vol % | 41 | | | | | | | | | |
| Thermoplastic resin (B) |  |  |  |  |  |  |  |  |  |  |  |
| Resin type | — | TP-8 (PEKK2) | | | | | | | | | |
| Crystalline/amorphous | — | Crystalline | | | | | | | | | |
| Tm(b)/Tg(b) | ° C. | 332/162 | | | | | | | | | |
| Volume content | Vol % | 41 | | | | | | | | | |
| Presence or absence of reinforcing fiber in boundary region | — | Exist across interface | | | | | | | | | |
| Tm difference | ° C. | 32 | | | | | | | | | |
| Average roughness length: RSm | μm | 30 | 49 | 37 | 45 | 29 | 38 | 53 | 55 | 27 | 26 |
| Average roughness height: Rc | μm | 30 | 21 | 24 | 29 | 31 | 28 | 22 | 17 | 27 | 12 |
| Thickness | mm | 0.32 | | | | | | | | | |
| Thickness ratio of layer (A) | % | 50 | | | | | | | | | |
| Interlaminar shear strength | MPa | 41 | 52 | 44 | 49 | 39 | 37 | 37 | 49 | 39 | 30 |
| Integrated product |  |  |  |  |  |  |  |  |  |  |  |
| Joining strength | — | B | A | B | A | B | B | A | A | B | C |
| Joining strength in high-temperature atmosphere | — | A | A | A | A | A | A | A | A | A | A |

TABLE 2

|  |  | Example 11 | Example 12 | Example 13 | Example 14 | Example 15 | Example 16 | Example 17 | Example 18 | Example 19 |
|---|---|---|---|---|---|---|---|---|---|---|
| Fiber-reinforced resin substrate |  |  |  |  |  |  |  |  |  |  |
| Reinforcing fiber |  | CF-2 | | | | CF-1 | | | | |
| Strand tensile strength |  | 4.9 | | | | 5.9 | | | | |
| Surface free energy |  | 20 | | | | 20 | | | | |
| Compound |  | — | a-4 | | | — | a-4 | | | |

TABLE 2-continued

| | | Example 11 | Example 12 | Example 13 | Example 14 | Example 15 | Example 16 | Example 17 | Example 18 | Example 19 |
|---|---|---|---|---|---|---|---|---|---|---|
| Thermoplastic resin (A) | | | | | | | | | | |
| Resin type | — | TP-7 (PEKK1) | TP-8 (PEKK2) | TP-8 (PEKK2) | TP-10 (PA6) | TP-10 (PA6) | TP-3 (PPS) | TP-3 (PPS) | TP-7 (PEKK1) | TP-7 (PEKK1) |
| Crystalline/amorphous | — | Crystalline | Crystalline | Crystalline | Crystalline | Crystalline | Crystalline | Crystalline | Crystalline | Crystalline |
| Tm(a)/Tg(a) | °C. | 300/160 | 332/162 | 332/162 | 215/50 | 215/50 | 284/90 | 284/90 | 300/160 | 300/160 |
| Volume content | Vol % | 41 | 41 | 41 | 38 | 38 | 42 | 42 | 47 | 41 |
| Thermoplastic resin (B) | | | | | | | | | | |
| Resin type | — | TP-8 (PEKK2) | TP-9 (PEKK3) | TP-2 (PEEK) | TP-2 (PEEK) | TP-8 (PEKK2) | TP-2 (PEEK) | TP-8 (PEKK2) | TP-8 (PEKK2) | TP-8 (PEKK2) |
| Crystalline/amorphous | — | Crystalline | Crystalline | Crystalline | Crystalline | Crystalline | Crystalline | Crystalline | Crystalline | Crystalline |
| Tm(b)/Tg(b) | °C. | 332/162 | 332/162 | 343/143 | 343/143 | 332/162 | 343/143 | 332/162 | 332/162 | 332/162 |
| Volume content | Vol % | 41 | 41 | 41 | 41 | 41 | 41 | 41 | 47 | 41 |
| Presence or absence of reinforcing fiber in boundary region | — | | | | Exist across interface | | | | | Exist across boundary region |
| Tm difference | °C. | 32 | 0 | 11 | 128 | 117 | 59 | 52 | 32 | 32 |
| Average roughness length: RSm | μm | 44 | 62 | 50 | 50 | 44 | 51 | 45 | 44 | 42 |
| Average roughness height: Rc | μm | 14 | 11 | 15 | 15 | 13 | 15 | 14 | 14 | 18 |
| Thickness | mm | 0.32 | 0.32 | 0.32 | 0.33 | 0.33 | 0.31 | 0.31 | 0.32 | 0.32 |
| Thickness ratio of layer (A) | % | 50 | 50 | 50 | 52 | 52 | 49 | 49 | 50 | 50 |
| Interlaminar shear strength | MPa | 32 | 38 | 32 | 33 | 32 | 32 | 32 | 38 | 33 |
| Integrated product | | | | | | | | | | |
| Joining strength | — | C | C | C | C | C | C | C | A | C |
| Joining strength in high-temperature atmosphere | — | A | A | A | D | D | C | C | A | A |

TABLE 3

| | | Comparative Example 1 | Comparative Example 2 | Comparative Example 3 |
|---|---|---|---|---|
| Fiber-reinforced resin substrate | | | | |
| Reinforcing fiber | | CF-1 | — | CF-1 |
| Strand tensile strength | | 5.9 | — | 5.9 |
| Surface free energy | | 20 | — | 20 |
| Compound | | a-4 | — | a-4 |
| Thermoplastic resin (A) | | | | |
| Resin type | — | TP-7 (PEKK1) | | TP-5 (modified PP) |
| Crystalline/amorphous | — | Crystalline | | Crystalline |
| Tm(a)/Tg(a) | °C. | 300/160 | | 165/0 |
| Volume content | Vol % | 41 | 0 | 33 |
| Thermoplastic resin (B) | | | | |
| Resin type | — | TP-8 (PEKK2) | | TP-2 (PEEK) |
| Crystalline/amorphous | — | Crystalline | | Crystalline |
| Tm(b)/Tg(b) | °C. | 332/162 | 0 | 343/143 |
| Volume content | Vol % | 41 | 0 | 41 |
| Presence or absence of reinforcing fiber in boundary region | — | Not exist | | Exist across interface |
| Tm difference (or Tm (b) − Tg (a)) | °C. | 32 | | 168 |
| Average roughness length: RSm | μm | 216 | — | 50 |
| Average roughness height: Rc | μm | 1 | — | 15 |
| Thickness | mm | 0.32 | 0.19 | 0.36 |
| Thickness ratio of layer (A) | % | 50 | 50 | 56 |
| Interlaminar shear strength | MPa | 17 | 8 | 31 |
| Integrated product | | | | |
| Joining strength | — | D | D | C |
| Joining strength in high-temperature atmosphere | — | B | B | E |

DESCRIPTION OF REFERENCE SIGNS

1: Fiber-reinforced resin substrate
2: Reinforcing fiber
3: Thermoplastic resin (A) layer
4: Thermoplastic resin (B) layer
5: Interface
6: Notch
7: Fiber direction of reinforcing fiber
8: Observation cross section
9: Baseline
10: Vertical baseline
11: Profile curve
12: Facing surface of thermoplastic resin (A) layer
13: Facing surface of thermoplastic resin (B) layer
14: Boundary region
15: Air (air gap)
16: Mold
17: Carbon fiber-reinforced thermoplastic resin (A) pellet
18: Injection molding machine
19: Carbon fiber-reinforced thermoplastic resin (B) pellet
20: Carbon fiber-reinforced thermoplastic resin (A) molded article
21: Carbon fiber-reinforced thermoplastic resin (B) molded article 22: Test piece for measuring joining strength of integrated product
23: Notched test piece

The invention claimed is:

1. A fiber-reinforced resin substrate obtained by impregnating a thermoplastic resin (A) and a thermoplastic resin (B) into continuous reinforcing fibers,
    wherein a thermoplastic resin (A) layer, which comprises the thermoplastic resin (A) and is exposed at one surface, and a thermoplastic resin (B) layer, which comprises the thermoplastic resin (B) and is exposed at the other surface, form a boundary region,
    at least some of the continuous reinforcing fibers exist across the boundary region, and
    both the thermoplastic resin (A) and the thermoplastic resin (B) are a crystalline resin having a melting point of 200° C. or higher, and
    wherein the reinforcing fibers are present in the form of a fiber bundle in which long fiber-reinforced fibers are arranged in one directing, a laminate of fiber bundles, or a woven fabric, and are used in a state of being aligned in a tape shape or a sheet shape.

2. The fiber-reinforced resin substrate according to claim 1, wherein a difference in melting point between the thermoplastic resin (A) and the thermoplastic resin (B) is 10 to 50° C.

3. The fiber-reinforced resin substrate according to claim 1, wherein the thermoplastic resin (A) layer exposed at the one surface and the thermoplastic resin (B) layer exposed at the other surface are joined to each other by forming an interface.

4. The fiber-reinforced resin substrate according to claim 1, wherein an interlaminar shear strength between the thermoplastic resin (A) layer and the thermoplastic resin (B) layer as measured according to JIS K7092 (2005) is 30 MPa or more.

5. The fiber-reinforced resin substrate according to claim 1, wherein the thermoplastic resin (A) and the thermoplastic resin (B) are different resin types.

6. The fiber-reinforced resin substrate according to claim 1, wherein the thermoplastic resin (A) is a resin selected from the group consisting of polyarylene ether ketone, polyphenylene sulfide, polyether ether ketone, and polyether ketone ketone.

7. The fiber-reinforced resin substrate according to claim 1, wherein a thickness of the thermoplastic resin (A) layer is 20 to 80% of a thickness of the fiber-reinforced resin substrate.

8. The fiber-reinforced resin substrate according to claim 1, wherein a volume content of reinforcing fibers of the thermoplastic resin (A) layer and the thermoplastic resin (B) layer is 30 vol % or more.

9. The fiber-reinforced resin substrate according to claim 1, wherein melting points of the thermoplastic resin (A) and the thermoplastic resin (B) are both 250° C. or higher and/or glass transition temperatures of the thermoplastic resin (A) and the thermoplastic resin (B) are both 100° C. or higher.

10. The fiber-reinforced resin substrate according to claim 1, wherein thermal decomposition start temperatures of the thermoplastic resin (A) and the thermoplastic resin (B) are 480° C. or higher.

11. The fiber-reinforced resin substrate according to claim 1, wherein reinforcing fibers having a surface free energy as measured by a Wilhelmy plate method of 10 to 50 mJ/m$^2$ are used as the reinforcing fibers.

12. The fiber-reinforced resin substrate according to claim 1, wherein a tensile strength of the reinforcing fiber is 5.5 GPa or more.

13. The fiber-reinforced resin substrate according to claim 1, wherein in a cross section in a thickness direction taken along a direction of 45 degrees with respect to a fiber direction of the reinforcing fiber, a profile curve formed by the interface has an average roughness length RSm, defined in JIS B0601 (2001), of 100 μm or less and an average roughness height Rc of 3.5 μm or more.

14. The fiber-reinforced resin substrate according to claim 1, wherein a thickness of the fiber-reinforced resin substrate is 500 μm or less.

15. A preform comprising the fiber-reinforced resin substrate according to claim 1, the fiber-reinforced resin substrate being disposed between a member A having a thermoplastic resin (A) on a surface thereof and a member B having a thermoplastic resin (B) on a surface thereof such that the thermoplastic resin (A) layer and the thermoplastic resin (B) layer of the fiber-reinforced resin substrate are in contact with the thermoplastic resin (A) of the member A and the thermoplastic resin (B) of the member B, respectively.

16. An integrated product obtained by welding a member A having a thermoplastic resin (A) on a surface thereof and a member B having a thermoplastic resin (B) on a surface thereof with the fiber-reinforced resin substrate according to claim 1 interposed therebetween such that the thermoplastic resin (A) layer and the thermoplastic resin (B) layer of the fiber-reinforced resin substrate are welded to the thermoplastic resin (A) of the member A and the thermoplastic resin (B) of the member B, respectively.

17. The integrated product according to claim 16, wherein the member A and/or the member B is a fiber-reinforced resin.

18. A method for producing a fiber-reinforced resin substrate obtained by impregnating a thermoplastic resin (A) and a thermoplastic resin (B) into continuous reinforcing fibers, comprising:
    impregnating a thermoplastic resin (A) from one surface of a continuous reinforcing fiber sheet to obtain a semi-preg having a thermoplastic resin (A) layer exposed at one surface and the continuous reinforcing fiber sheet exposed at the other surface; impregnating a thermoplastic resin (B) from the other surface of the semi-preg or impregnating a thermoplastic resin (B) from one surface of the continuous reinforcing fiber sheet to obtain a semi-preg having a thermoplastic resin (B) layer exposed at one surface and the continuous reinforcing fiber sheet exposed at the other surface; and impregnating the thermoplastic resin (A) from the other surface of the semi-preg, and
    wherein the reinforcing fibers are present in the form of a fiber bundle in which long fiber-reinforced fibers are arranged in one directing, a laminate of fiber bundles, or a woven fabric, and are used in a state of being aligned in a tape shape or a sheet shape.

* * * * *